(12) United States Patent
Honjo (10) Patent No.: US 7,839,818 B2
(45) Date of Patent: Nov. 23, 2010

(54) RADIO COMMUNICATION DEVICE AND COMMUNICATION LOAD CALCULATION METHOD THEREFOR

(75) Inventor: Masanori Honjo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 120 days.

(21) Appl. No.: 12/169,533

(22) Filed: Jul. 8, 2008

(65) Prior Publication Data
US 2009/0016239 A1    Jan. 15, 2009

(30) Foreign Application Priority Data
Jul. 10, 2007  (JP) .............................. 2007-180640

(51) Int. Cl.
 *H04W 4/00* (2009.01)
 *H04J 3/00* (2006.01)
 *H04J 3/16* (2006.01)
 *H04J 3/22* (2006.01)
(52) U.S. Cl. ..................... 370/328; 370/336; 370/468
(58) Field of Classification Search ................. 370/329, 370/331, 332, 336, 470–477
See application file for complete search history.

(56) References Cited

U.S. PATENT DOCUMENTS

| | | | |
|---|---|---|---|
| 6,845,091 B2 * | 1/2005 | Ogier et al. .................. | 370/338 |
| 6,967,958 B2 * | 11/2005 | Ono et al. .................... | 370/401 |
| 7,301,965 B2 * | 11/2007 | Cimini et al. ................ | 370/470 |
| 7,433,309 B2 * | 10/2008 | Rue ............................. | 370/232 |
| 7,523,059 B2 * | 4/2009 | Tezuka et al. ............... | 705/36 R |
| 2002/0089933 A1 * | 7/2002 | Giroux et al. ............... | 370/236 |
| 2003/0210672 A1 | 11/2003 | Cromer | |
| 2005/0013288 A1 * | 1/2005 | Hong et al. .................. | 370/352 |
| 2005/0099950 A1 * | 5/2005 | Koga ........................... | 370/241 |
| 2006/0104370 A1 * | 5/2006 | Yamanaka et al. ........... | 375/242 |
| 2006/0154699 A1 * | 7/2006 | Ko et al. ...................... | 455/574 |
| 2006/0250301 A1 * | 11/2006 | Yamakoshi et al. ......... | 342/357.1 |
| 2007/0064669 A1 * | 3/2007 | Classon et al. .............. | 370/347 |
| 2007/0153916 A1 * | 7/2007 | Demircin et al. ......... | 375/240.26 |
| 2009/0141723 A1 * | 6/2009 | Giesberts et al. ............ | 370/392 |

FOREIGN PATENT DOCUMENTS

| | | |
|---|---|---|
| JP | 2003-060663 | 2/2003 |
| JP | 2004-320274 | 11/2004 |

OTHER PUBLICATIONS

ANSI/IEEE Std 802.11, 1999 Edition (R2003), "Part 11: Wireless LAN Medium Access Control (MAC) and Physical Layer (PHY) Specifications," pp. 1-528, Jun. 2003, p. 5, line 1.
"802.11 High-speed Wireless LAN Textbook" by Impressnet Business Company, Mar. 29, 2003, section 6.1, p. 100, with English translation, p. 5, line 4.

* cited by examiner

*Primary Examiner*—Chi H Pham
*Assistant Examiner*—Farah Faroul
(74) *Attorney, Agent, or Firm*—Dickinson Wright PLLC (57) ABSTRACT

A radio communication device for data communication with another terminal through wireless medium, includes: a communicator which transmits/receives data by predetermined data communication units; a communication meter which measures a data communication unit which is actually communicated for a predetermined period in the communicator; and a controller which finds an average unit length of the data communication for the period on the basis of a measure result in the communication meter so as to obtain communication load information based on the average unit length.

18 Claims, 10 Drawing Sheets

| TRANSMISSION RATE / PACKET LENGTH | 54Mbps | 48Mbps | . . | 6Mbps |
|---|---|---|---|---|
| 64 | . . | . . | . . | . . |
| 128 | . . | . . | . . | . . |
| 256 | 10Mbps | . . | . . | . . |
| 384 | . . | . . | . . | . . |
| 512 | . . | . . | . . | . . |
| 768 | . . | . . | . . | . . |
| . . | . . | . . | . . | . . |
| 1500 | 31Mbps | . . | . . | . . |

FIG. 9

| TRANSMISSION RATE / PACKET LENGTH | 54Mbps | 48Mbps | . . | 6Mbps |
|---|---|---|---|---|
| 64 | . . | . . | . . | . . |
| 128 | . . | . . | . . | . . |
| 256 | 4900 PACKETS | . . | . . | . . |
| 384 | . . | . . | . . | . . |
| 512 | . . | . . | . . | . . |
| 768 | . . | . . | . . | . . |
| . . | . . | . . | . . | . . |
| 1500 | 2600 PACKETS | . . | . . | . . |

RELATED ART

RADIO COMMUNICATION DEVICE AND COMMUNICATION LOAD CALCULATION METHOD THEREFOR

BACKGROUND

1. Technical Field

The present invention relates to, in a radio communication, a radio communication device in which loaded conditions of radio nodes which are present in communication partners and communication routes are detected so that an optimum communication partner and communication route are selected in accordance with the loaded conditions so detected, and a communication load calculation method for the same system.

2. Background Art

In a radio communication such as a wireless LAN, selecting a radio node with little load as a communication partner becomes not only important to realize a higher throughput and a low delay but also useful in making effective use of the resources of the whole communication network through load distribution.

Incidentally, in a wireless LAN specified under IEEE 802.11 illustrated in Non-Patent Document 1, with IEEE 802.11a, a communication speed is specified as a maximum transmission rate of 54 Mbps. However, this transmission rate is a rate for a physical layer, and hence, an actual communicable throughput is reduced by a CSMA/CA access control in an MAC (Media Access Control) layer or the like.

Here, the CSMA/CA access control which utilizes the DCF specified under IEEE 802.11 will briefly be described by reference to page 76 of the "9.2.5 DCF access procedure" and page 83 of the "9.2.8 ACK procedure" of Non-Patent Document 1.

Figure 19:
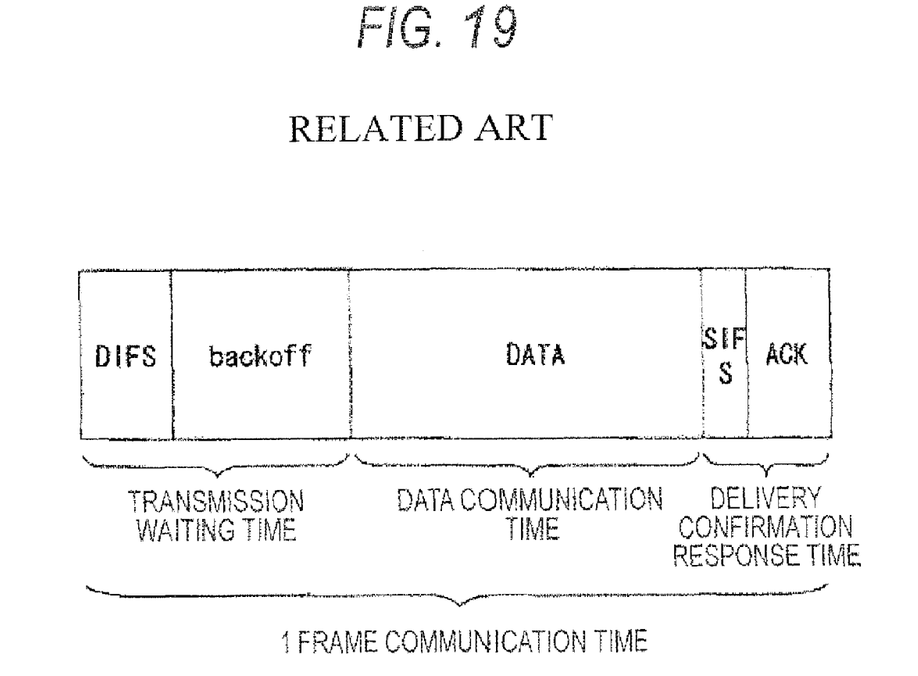
FIG. 19 is a diagram showing simply a communication time when transmitting data using an access control called DCF.

FIG. 19 is a diagram which simply illustrates a communication time when data is transmitted using the access control called DCF (Distributed Coordination Function).

Firstly, before starting a communication, a transmission is waited for by a fixed length of time called DIFS (Distributed Interframe Space) and a random length of time called backoff. Next, a radio frame (described as DATA in the figure) which is actual transmission data is transmitted, and finally, in order to confirm a proper delivery of the radio frame to a target terminal, waiting for a length of time called SIFS (Short Interframe Space) and an ACK (Acknowledge) response from the target terminal is performed, and the reception of the ACK response completes the transmission of the radio frame.

In the frame transmission time illustrated in FIG. 19, it is only a portion of actual data transmission time that is to be changed in length of time by the size of data to be transmitted. In other words, irrespective of the size of data to be transmitted, the extra time of "transmission waiting time+delivery confirmation response time" is generated at all times. Consequently, in the event that short data of the order of 256 bytes are transmitted, compared with a case where long data of the order of 1500 bytes are transmitted, the ratio of "transmission waiting time+delivery confirmation time" to the one frame transmission time becomes large. Because of this, in the wireless LAN of IEEE 802.11, the shorter the frame length (or the packet length which results by removing the frame header from the frame) becomes, the lower the communication efficiency becomes.

Here, throughputs associated with two packet lengths will be calculated using an expression for calculating a throughput which is described on page 100 of Non-Patent Document 2. When the length of an IP packet is 1500 bytes, a throughput becomes about 31 Mbps, while when the length of an IP packet is 256 bytes, a throughput becomes about 10 Mbps, and it is seen from this that three times or more throughput difference is generated depending upon packet lengths.

Incidentally, in recent years, a telephone service using IP, that is, so-called IP phones have been in propagation, and due to its easiness in handling, there has emerged case where the IP phones are used in the wireless LANs. In the IP phones, conversations are implemented thereover by exchanging voice packets with a communication partner as communication data, and in voice packets, although depending upon compression systems, the packet length becomes shorter in general.

For example, the length of a code when coding is implemented by the PCM used under G.711 becomes 64 Kbps. In the event that a voice packet is transmitted by being packetized every 20 ms so that a large delay is not generated, the data volume of a voice part becomes about 160 bytes. Even when a header such as RTP, UDP, IP or the like is added to this voice part, the resulting data volume is on the order of about 200 bytes (and even when a frame header of the wireless LAN is also added thereto, the resulting data volume becomes on the order of about 240 bytes).

In addition, when using a voice encoding which has a higher compression rate as in G.729, the data volume of the voice part becomes smaller. When many packets such as voice having such a short packet length are transmitted using radio waves, there may be caused a situation in which the load is increased high even when a band which is used in an actual communication is not large. For example, assume that an actual communication band is 7 Mbps with the transmission rate being 54 Mbps in 802.11a. In addition, assume that a threshold which determines a high load is a load factor of 60% or more. In this situation, in case an average packet length in an actual communication is 1500 bytes, a throughput becomes about 31 Mbps, and because of this, the load factor becomes 23%, which is not a high load. When the average packet length is 256 bytes, however, since the throughput becomes about 10 Mbps, the load factor becomes about 70%, which is a high load.

Furthermore, in the case of the transmission control protocol or TCP, since it is a communication protocol which is redundant by such an extent that TCP ACK is returned by a communication partner, a communicable band becomes narrow compared with UDP. Because of this, a communication band which is determined to be highly loaded is much narrower than UDP.

On the other hand, it is described in Patent Document 1 and Patent Document 2 as related to load distribution, that load is determined based on a total data volume to be transmitted or bandwidth. Conventionally, in this way, the state of load has been grasped simply according to a band which is used currently without depending upon packet length.

In addition, as a technique in relation to QoS, it is described in Patent Document 3 that a band is guaranteed by totalizing traffics and changing access point of radio nodes in accordance with the totalized traffics between base stations. Conventionally, in this way, the QoS control has been implemented based on the traffic amounts without depending upon packet length.

[Patent Document 1] JP-A-2004-320274
[Patent Document 2] JP-T-2005-530378
[Patent Document 3] JP-A-2003-060663
[Non-Patent Document 1] ANSI/IEEE Std 802.11, 1999 Edition Part 11: Wireless LAN Medium Access Control (MAC) and PHYsical Layer (PHY) Specifications
[Non-Patent Document 2] "802.11 High-speed Wireless LAN Textbook" by IMPRESSNET BUSINESS COMPANY, on Mar. 29, 2003

However, as in the aforesaid wireless LAN, since a communicable band changes depending upon a packet length which is used in an actual communication, in a communication state where there are communicated many short packets, in the case of Patent Document 1 and Patent Document 2, there occurs a case where a highly loaded state is not determined although it exists in reality. In these circumstances, an accurate loaded state cannot be grasped by the calculation of a loaded state of a radio node based on simple communication volume, and the radio terminal cannot select accurately a radio AP which is little loaded.

In addition, the same problem is provided not only between a radio terminal and a radio AP but also between radio nodes which implement a multi-hop transfer as in a mesh network or ad hoc network. Namely, when a route including a radio node which is little loaded is selected as a transferring destination in multi-hop transfer, in the event that a load calculation method does not take packet length into consideration, an accurate loaded state cannot be calculated, and as a result, a route which is little loaded cannot be selected accurately.

Additionally, in the case of the radio AP which provides the band guarantee service, in the event that an average packet length of a currently used band is not taken into consideration as in Patent Document 3, or in the event that an average packet length on the band requesting side is not taken into consideration, it cannot be determined accurately whether or not the requested band can really be guaranteed. For example, in the event that a band of 12 Mbps is requested when communications are carried out under IEEE 802.11a whose transmission rate is 54 Mbps, according to the conventional method, it is determined that the band can be guaranteed in case there exists a radio node whose current band utilization is zero. However, in reality, the requested band guarantee depends on the average packet length on the band requesting side, and since in case the average packet length is 1500 bytes, the requested band can be guaranteed, but in case the average packet length is 256 bytes, a throughput that can be provided is 10 Mbps at maximum, as a result, the requested band cannot be guaranteed, and this means that the wrong determination has been made above.

SUMMARY

An object of the invention is to provide a radio communication device which can obtain an accurate loaded state in accordance with a packet length used in an actual communication and a communication load calculation method therefor.

According to an aspect of the invention, there is provided a radio communication device for data communication with another terminal through wireless medium, including: a communicator which transmits/receives data by predetermined data communication units; a communication meter which measures a data communication unit which is actually communicated for a predetermined period in the communicator; and a controller which finds an average unit length of the data communication unit for the period on the basis of a measure result in the communication meter so as to obtain communication load information based on the average unit length.

According to the configuration described above, it is possible to grasp a communication load state which takes into consideration the packet length which is actually communicated.

According to the aspect of the invention, it becomes possible to calculate an accurate loaded state in accordance with a packet length which is used in an actual communication. In addition, another terminal is selected for connection in accordance with the communication load information so calculated, the communication efficiency is increased.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION

Hereinafter, embodiments of the invention will be described with reference to the accompanying drawings. Note that in respective embodiments, portions which are related to each other can be used interchangeably.

Embodiment 1

In terms used in this embodiment, a packet and an IP packet mean a unit of data to be transmitted or received which are used in a network layer (IP layer) in an OSI reference model.

In addition, a frame and a radio frame mean a unit of data to be transmitted or received which are used in a data link layer (which is sometimes described as an MAC layer which is part of the data link layer) in the OSI reference model.

In a wireless LAN, a radio frame header is added to an IP packet for communication. Although a communication band is calculated using either a frame length or a packet length, in this embodiment, a band is calculated using a packet length. However, there will be no difference in the basic idea even though a throughput is calculated using either a frame length or a packet length.

A radio node denotes equipment or a device which transmits and receives a frame using radio frequency signals. For example, included therein are radio AP, radio terminal, a radio router, a radio repeater and the like. In addition, the radio node does not have to be equipment used exclusively for communication but may be a domestic electric appliance equipped with a communication function.

Firstly, a method will be described which calculates a "communicable band" or the "number of packets which can be communicated" which are associated with a packet length in a wireless LAN.

Here, as an example, a case will be described in which a transmission rate is 54 Mbps under IEEE 802.11a and UDP is used as a communication protocol. In addition, a communication band is a throughput by an IP packet.

As described in the explanation based on FIG. 19, time necessary for data communication in the wireless LAN is given by Expression 1.

One frame communication time=DIFS+backoff+data communication time+delivery confirmation response time (SIFS+ACK)  [Expression 1]

In the case of IEEE 802.11a, DIFS is made to be 34 μs, and a backoff average is made to be 67.5 μs provided that no collision occurs between radio frames. In addition, according to what is described on page 100 of Non-Patent Document 2, the data communication time when the transmission rate is 54 Mbps under IEEE 802.11a is given by Expression 2 below.

Data communication time=(16+4×(1+roundup((16+24×8+8×8+packet length×8+4×8+6)/216)))  [Expression 2]

For example, in case the IP packet length is 1500 bytes, the data communication time becomes 248 μs, while in case the IP packet length is 256 bytes, the data communication time becomes 64 μs. In addition, SIFS is 16 μs, and the delivery confirmation response time is given by Expression 3 below.

Delivery confirmation response time=16+(16+4×(1+roundup((16+10×8+4×8+6)/216)))=40 μs  [Expression 3]

Consequently, since the one frame communication time is "DIFS+backoff+data communication time+delivery confirmation response time," in the case of the IP packet length being 1500 bytes, the one frame communication time becomes 34+67.5+248+40=389.5 μs, whereas in the case of the IP packet length being 256 bytes, 34+67.5+64+40=205.5 μs.

On the other hand, a calculating expression of a communicable band (a throughput) is shown by Expression 4.

Throughput=the number of packets that can be transmitted for a second×the number of bits of IP packet=(unit time×the number of bytes of IP packet×8)/(one frame communication time)  [Expression 4]

Figure 6:
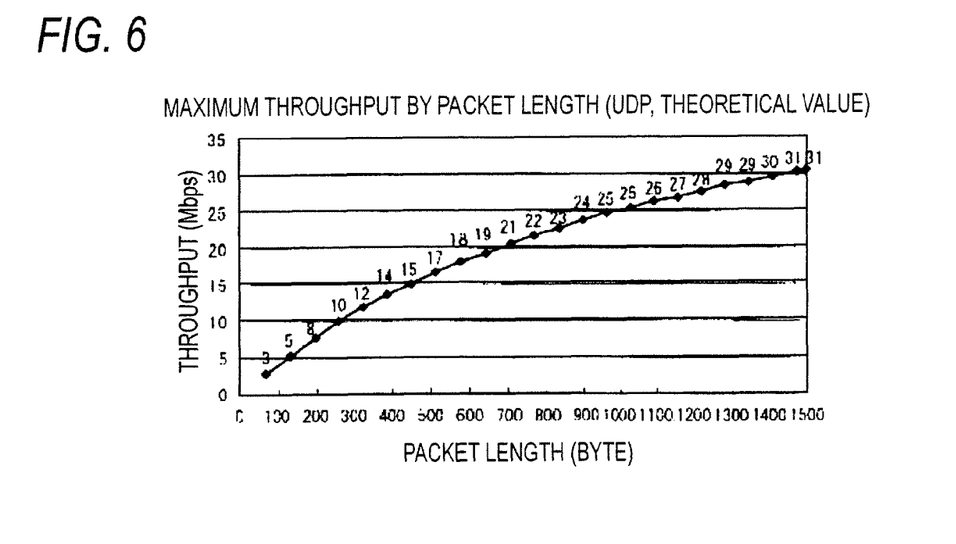
FIG. 6 is a graph showing a relationship between packet length and throughput in Embodiment 1.

From this expression 4, when the IP packet length is 1500 bytes, the throughput becomes about 31 Mbps, while when the IP packet length is 256 bytes, the throughput becomes about 10 Mbps. When a relationship between packet length and throughput is shown in graph using Expression 4, what is depicted in FIG. 6 results.

This shows a graph which illustrates a communicable band associated with the respective packet lengths when the transmission rate is 54 Mbps under IEEE 802.11a and UDP is used as the communication protocol. As is seen from this graph, since the communicable band becomes narrower as the packet length becomes shorter, when a communicable band in radio communication is calculated, the packet length needs to be taken into consideration.

Next, the number of communicable packets can be calculated from time needed for communication using Expression 5 below.

The number of communicable packets=unit time/(one frame communication time)  [Expression 5]

Figure 7:
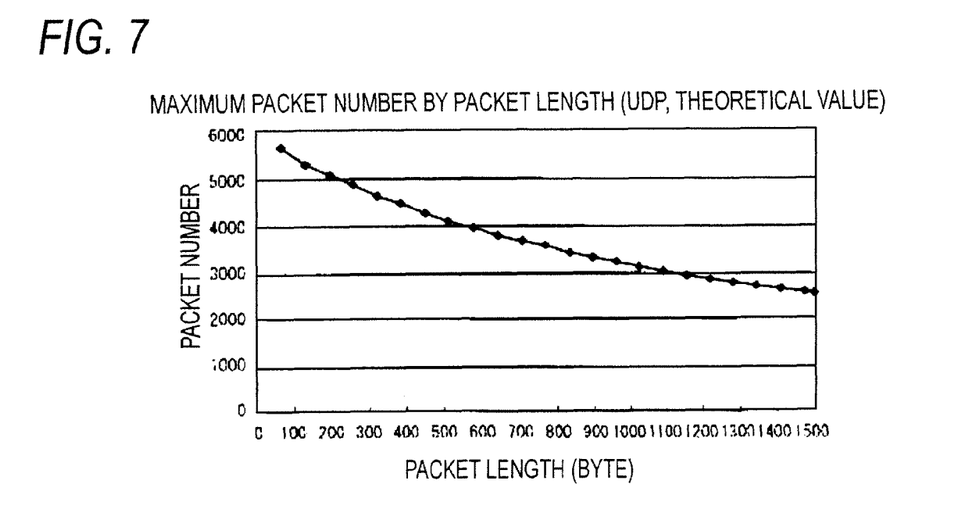
FIG. 7 is a graph showing a relationship between packet length and packet number in Embodiment 1.

From Expression 5, when the IP packet length is 1500 bytes, the number of communicable packets becomes about 2600 packets, while when the IP packet length is 256 bytes, the number of communicable packets becomes about 4900 packets. Similarly, when a relationship between packet length and the number of communicable packets is shown in graph, what is depicted in FIG. 7 results.

This shows a graph which illustrates the number of communicable packets which is associated with the respective packet lengths when the transmission rate is 54 Mbps under IEEE 802.11a and UDP is used as the communication protocol. As is seen from this graph, since the number of communicable packets changes depending upon packet lengths, when the number of communicable packets in radio communication is calculated, the packet length needs to be taken into consideration.

Figure 8:
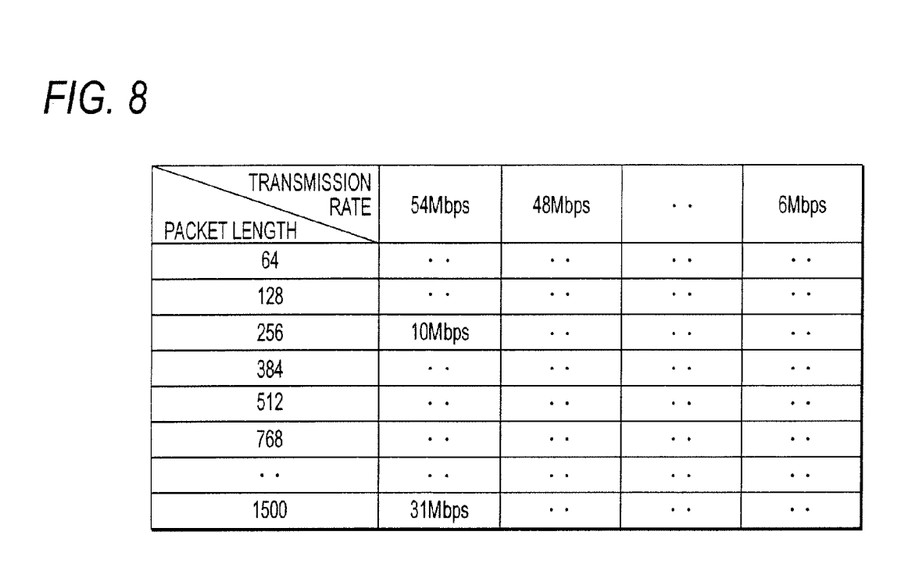
FIG. 8 is a diagram showing a table illustrating association between packet length and communicable band in Embodiment 1.
Figure 9:
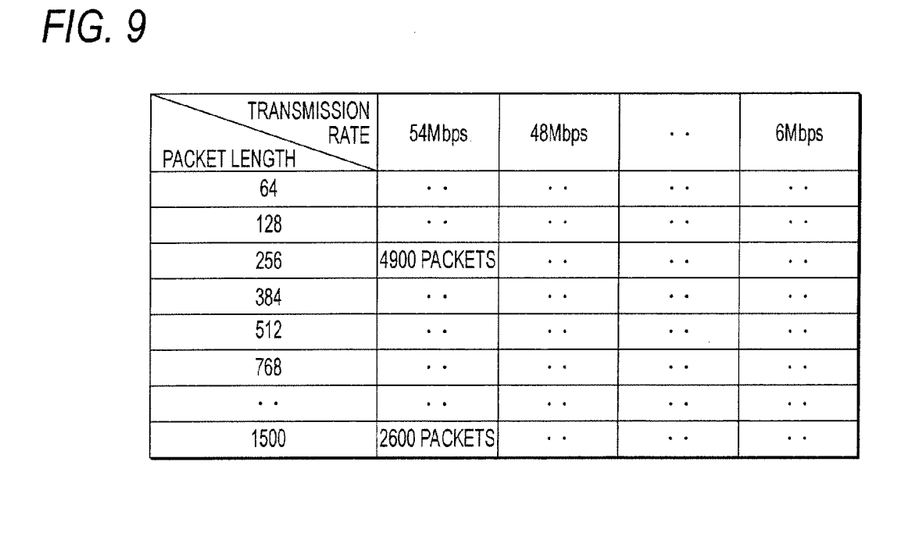
FIG. 9 is a diagram showing a table illustrating association between packet length and packet number in Embodiment 1.

These communicable band and number of communicable packets which are associated with the packet length may be calculated by the expressions described above or may be calculated using tables shown in FIGS. 8 and 9 in which communicable bands and numbers of communicable packets are held in advance in association with packet lengths.

Since FIGS. 8 and 9 show examples of discrete tables, communicable bands and numbers of communicable packets for intermediate packet lengths can be obtained through interpolation, and the tables do not have to be discrete but may be those which show communicable bands and numbers of communicable packets bit by bit. In addition, although the examples of communicable bands and numbers of communicable packets which are shown in the tables are calculation examples when UDP is used as the communication protocol, it will also be possible to calculate communicable bands and numbers of communicable packets by a similar manner in the case of TCP being used as the communication protocol.

A radio communication device which utilizes the "communicable bands" or "numbers of communicable packets" which are associated with the packet length in the aforesaid wireless LAN and its communication load determination operation will be described below.

Figure 1:
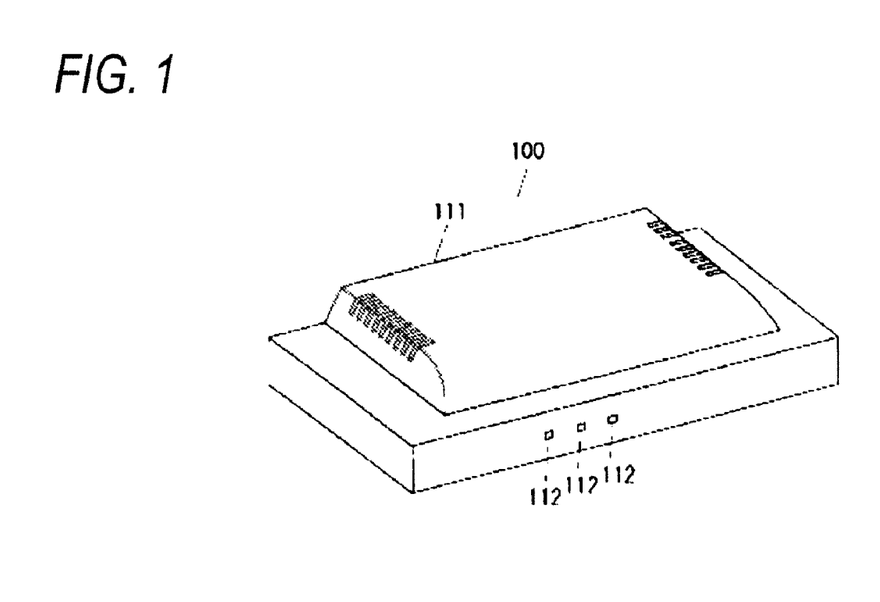
FIG. 1 is an external perspective view showing a front side of a radio AP of Embodiment 1.
Figure 2:
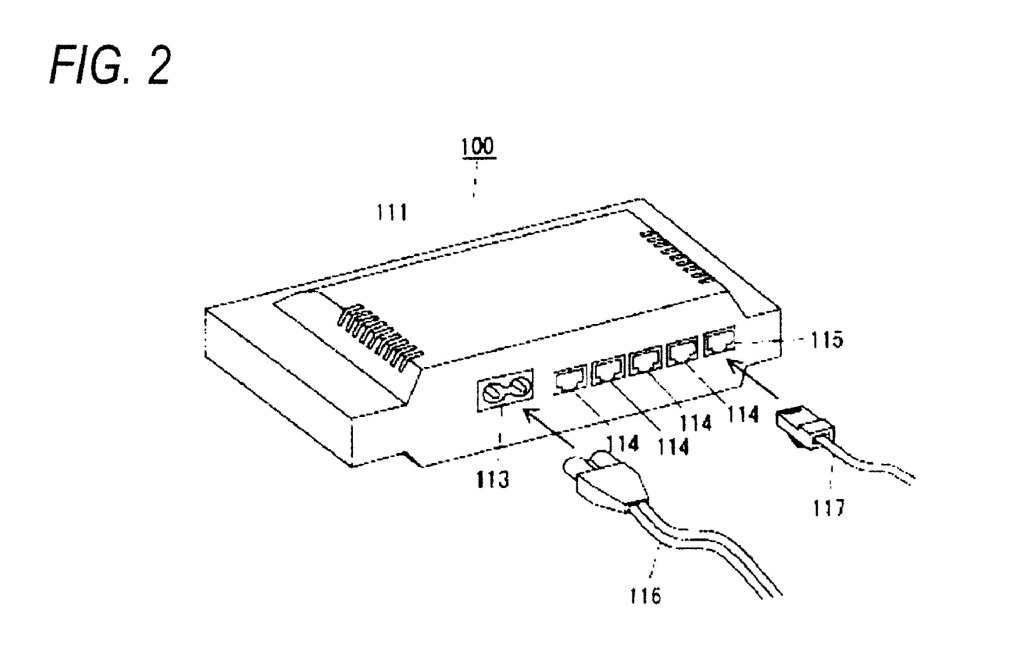
FIG. 2 is an external perspective view showing a back side of the radio AP of Embodiment 1.

FIG. 1 is an external perspective view showing a front side of a radio communication device of Embodiment 1, and FIG. 2 is an external perspective view showing a back side of the radio communication device of Embodiment 1, a router 100 equipped with a radio AP function (hereinafter, referred to as a "radio AP 100") being shown as an example of the radio communication device in those figures.

As is shown in FIGS. 1 and 2, the radio AP 100 has a housing 111, and indicators 112 such as LEDs (Light Emitting Diodes) are provided on a front side of the housing 111. A DC (Direct Current) power supply connector 113, LAN (Local Area Network) modular jacks 114 such as RJ45 and a WAN (Wide Area Network) modular jack 115 are provided on a back side of the housing 111.

A power line 16 such as a parallel cable is connected to the DC power supply connector 113. LAN cables 117 are connected to the modular jacks 114, 115. In addition, although the router is shown as an example of the radio AP, the radio AP is not limited thereto and hence, the radio AP may be any equipment which has an access point function (for example, a domestic electric appliance such as a TV).

Figure 3:
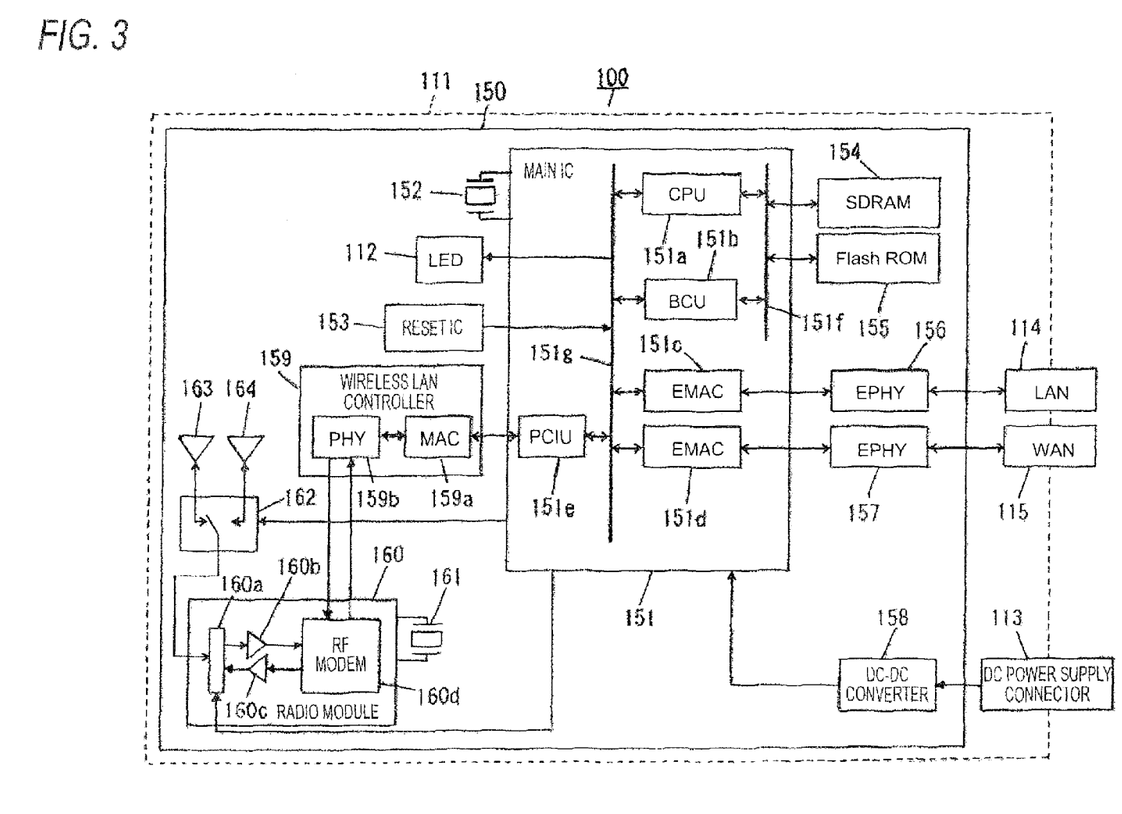
FIG. 3 is a hardware block diagram of the radio AP of Embodiment 1.

FIG. 3 is a hardware block diagram of the radio communication device of Embodiment 1 and shows a hardware configuration of the radio AP 100 shown in FIGS. 1 and 2.

As is shown in FIG. 3, the radio AP 100 has a circuit module 150 within the housing 111 which is indicated by a broken line. A main IC (Integrated Circuit) 151, a wireless LAN controller 159 and a radio module 160 are packaged in the circuit module 150.

The main IC 151 has a CPU (Central Processing Unit) 151a, buses such as a main bus 151f and a local bus 151g, a BCU (Bus Control Unit) 151b for controlling the flow of data on the buses, MAC blocks (EMAC) 151c, 151d for controlling a MAC (Medium Access Control) layer of the Ethernet (registered), and a PCIU 151e for controlling a PCI (Peripheral Component Interconnect Unit) bus.

The CPU 151a and BCU 151b within the main IC 151 are connected to an SDRAM (Synchronous Dynamic Random Access Memory) 154 and a Flash ROM (Flash Read Only Memory) 155 via the main bus 151f. In addition, the CPU 151a and BCU 151b are connected to an oscillator 152 for supplying a clock to the main IC 151, the indicators 112 such as LEDs and a reset IC 153 for outputting an initialization signal to the main IC 151 via the local bus 151g.

The MAC blocks 151c, 151d within the main IC 151 are connected respectively to EPHY 156 and EPHY 157 which are each a PHY (PHYsical Layer).IC for controlling the physical layer of the Ethernet (registered), and EPHY 156 and EPHY 157 are connected, respectively, to the LAN modular jack 114 and the WAN modular jack 115. In addition, the main IC 151 is connected to the DC power supply connector 113 via a DC-DC (Direct Current to Direct Current) converter 158. The DC-DC converter 158 converts a DC voltage supplied from the DC power supply connector 113 into a DC voltage which is needed by the main IC 151.

The wireless LAN controller 159 has an MAC block 159a for controlling the MAC layer and a PHY block 159b for controlling the physical layer. A PCIU 151e within the main IC 151 is connected to the PHY block 159b via the MAC block 159a.

A transmission state or reception state of the radio module 160 is set from the main IC 151, and the radio module 160 has a transmission/reception switching SW (Switch) 160a, an LNA (Low Noise Amplifier) 160b for amplifying a reception signal, a PA (Power Amplifier) 160c for amplifying a transmission signal and an RF (Radio Frequency) modulator/demodulator 160d for implementing modulation to a radio signal and demodulation from a radio signal.

The radio module 160 is connected to an oscillator 161 which supplies a clock to the radio module 160, and the RF modulator/demodulator 160d within the radio modulator 160 is connected to the PHY block 159b within the wireless LAN controller 159. The transmission/reception switching SW 160a within the radio module 160 is connected to antennas 163, 164 via an antenna switching SW 162 for switching antennas used from the main IC 151.

Figure 4:
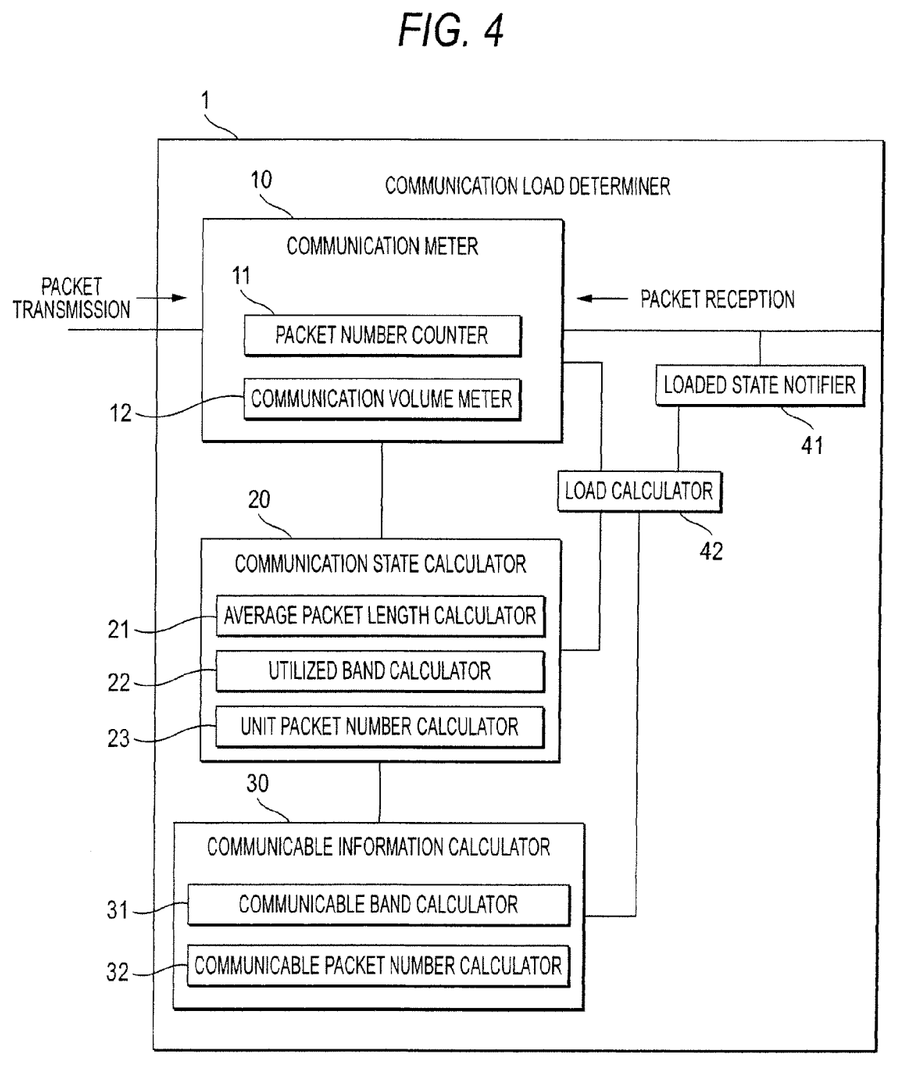
FIG. 4 is a functional block diagram of a radio communication device of Embodiment 1.

FIG. 4 is a functional block diagram of the radio communication device of Embodiment 1, which specifically illustrates a communication load determiner. The communication load determiner is built in the radio communication device for operation.

In FIG. 4, a communication meter 10 has a packet number counter 11 for counting the number of packets, and a communication volume meter 12 for measuring a communication data volume, and when a communication occurs, the packet counter 11 increases the number of packets by one, and the communication volume meter 12 adds a data volume associated with a packet length.

A communication state calculator 20 has an average packet length calculator 21, a utilized band calculator 22 and a unit packet number counter 23, which calculate, respectively, an average packet length, a utilized band and a packet number per unit time periodically or based on requests from other constituent components.

A communicable information calculator 30 has a communicable band calculator 31 and a communicable packet number calculator 32, which, given an average packet length, calculate a communicable band and a communicable packet number, respectively, which are associated with the average packet length so given using the aforesaid expressions 4 and 5 or the tables shown in FIGS. 8 and 9.

Here, a relationship between the functional configuration shown in FIG. 4 and the hardware shown in FIG. 3 will be described.

In FIGS. 3 and 4, the communication meter 10 and the communication state calculator 20 are realized by processing by the MAC block 159a of the wireless LAN controller 159.

In addition, the communicable information calculator 30, a load calculator 40, and a loaded state notifier 41 are realized by the CPU 151a processing data stored in the SDRAM 154 and the Flash RAM 155.

Next, the operation of the communication load determiner 1 will be described.

A radio node exchanges radio packets between other radio nodes and itself. When this packet communication occurs, the number of packets is counted up by the packet number calculator 11 of the communication calculator 10, and in the communication volume meter 12, a communication data volume is measured by adding up packet lengths of packets communicated.

The communication state calculator 20 calculates an average packet length, a utilized band and the number of packets per unit using the counted information by the communication meter 10 periodically or upon request from other constituent components. The average packet length calculator 21 calculates an average packet length actually communicated using Expression 6. The utilized band calculator 22 calculates a utilized band using Expression 7 while employing the information from the communication volume meter 12. The unit packet number calculator 23 calculates the number of packets per unit time using Expression 8 while employing the number of packets counted by the packet number counter 11.

Average packet length=(communication data volume measured by the communication volume meter)/(the number of packets counted by the packet number counter)    [Expression 6]

Utilized band=(communication data volume measured by the communication volume meter)/(measuring time)    [Expression 7]

Unit time packet number=(the number of packets counted by the packet number counter)/(measuring time)    [Expression 8]

However, since the values obtained using Expression 6, Expression 7 and Expression 8 are measured values per unit time which were measured just before, when it is determined that there will be caused many variations by utilization of the values which were measured just before, there is no need to stick to these expressions. For example, the past counted and measured information may be stored, so that moving average is used or a calculation value resulting by weighting a latest packet is used.

When the average packet length, the utilized band and the unit time packet number are so calculated, by giving the average packet number to the communication state calculator 22, a communicable band associated with the average packet length or a communicable packet number associated with the average packet length is calculated.

The load calculator 40 calculates a load factor from the utilized band and the communicable band using Expression 9. Alternatively, the load calculator 40 calculates a load factor from the unit time packet number and the communicable packet number using Expression 10.

Load factor=(utilized band)/(communicable band associated with average packet length)    [Expression 9]

Load factor=(unit time packet number)/(communicable packet number associated with average packet length)    [Expression 10]

In the event that a threshold indicating a highly loaded state is set in advance, the loaded state notifier 41 determines using the load factor calculated by the load calculator 40 whether or not a highly loaded state exists by comparing the threshold with the load factor so calculated. Consequently, information on whether or not the radio node is in the highly loaded state based on the load factor calculated in the way described above or the mere value of the load factor can be given to other nodes by way of the loaded state notifier 41. The other nodes which have received the loaded state can grasp not only whether or not the radio node which has transmitted the loaded state is in the highly loaded state but also the ratio of load from the load factor.

Here, while the example has been illustrated in which the type of protocol of the IP packet is UDP, the invention can also deal with a case where UDP and TCP are mixed as the communication protocol. As has been described before, since in TPC, the delivery confirmation response of TCP is implemented in the network layer, the communicable band associated with the packet length is low, compared with UDP. Although not shown, in the communication calculator 10, the type of protocol, that is, TCP or UDP, is determined, a packet number and communication volume are measured for each protocol, and thereafter, a communication state, communicable information, and a load factor are calculated for each protocol in the same way as described in relation to the operation example of UDP. Finally, the load factors which are calculated separately are added together for calculation of a loaded state. As this occurs, in the case of a packet in an IP protocol such as ICMP other than TCP or UDP protocol or a packet of ARP which is not an IP protocol, the processing is carried out by regarding them as UDP protocol or those packets may be regarded as control data so as to be disregarded from the items involved in loaded state calculation.

Figure 5:
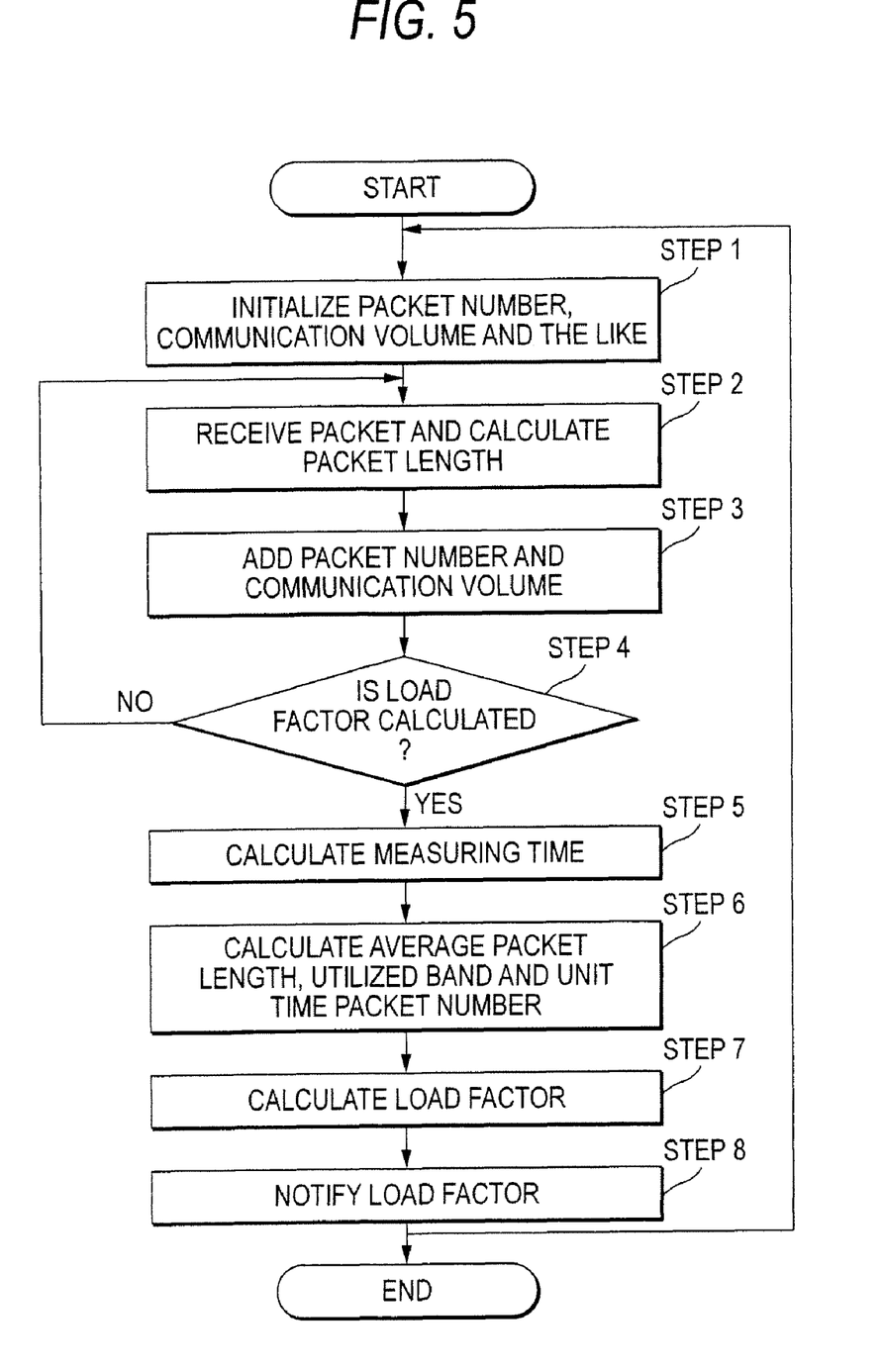
FIG. 5 is a flowchart illustrating the operation of the radio communication device of Embodiment 1.

FIG. 5 is a flowchart illustrating the operation of the radio communication device of Embodiment 1 and specifically illustrating the operation of the communication load determiner 1.

In FIG. 5, in step 1, various parameters such as packet number, communication volume and measuring starting time are initialized. In step 2, a packet to be communicated is received, so as to calculate a packet length.

In step 3, the packet number is added by one, and the communication volume is added by a volume equal to the packet length. In step 4, if a time for load factor calculation has been reached or a load factor calculation trigger has been inputted, then the flow proceeds to step 5. If it is determined not to calculate a load factor, then the flow returns to step 2, so as to continue measuring the next packet.

In step 5, a measuring time is calculated. In step 6, an average packet length, a utilized band and a unit time packet number are calculated using the calculating expressions shown in Expression 6 to Expression 8. In step 7, a load factor is calculated using the calculating expression shown in Expression 9 or Expression 10.

In step 8, the load factor so calculated is notified. Finally, if the processing is to continue, then, the flow returns to step 1 for implementation of the processing.

Thus, as has been described heretofore, in Embodiment 1, the number of packets and communication volume in the actual communication are measured as statistic information by the communication meter 10, and in the communication state calculator 20, the average packet length and the utilized band are calculated from the statistic information. In communicable information calculator 30, a communicable band associated with the average packet length of the current communication is calculated from the table showing communicable bands relative to average packet lengths listed for transmission rates which have been obtained in advance from average packet lengths or the calculating expression for communicable band, and in the load calculator 40, the load factor is calculated from the communicable band and the utilized band. Then, in the loaded state notifier 41, the calculated load factor is notified.

In addition, in the loaded state notifier 41, if the loaded factor so calculated exceeds the predetermined threshold, the radio node is determined to be in the highly loaded state, and the fact that the radio node is in the highly loaded state is notified to other radio nodes together with the calculated load factor, or connection requests from the other radio nodes are rejected.

These points will be described based on the case where the radio communication device is the radio AP 100.

Figure 10:
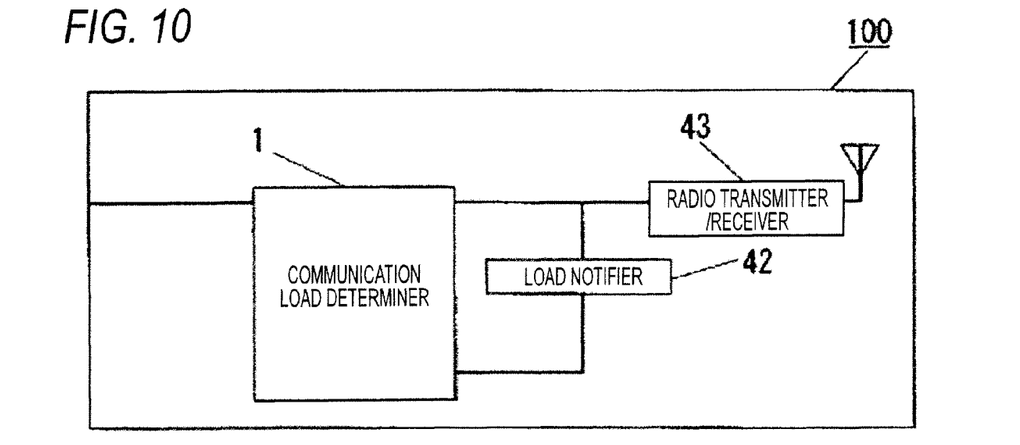
FIG. 10 is a functional block diagram of a radio AP of Embodiment 2.

In FIG. 10, when implementing a radio packet communication, the radio AP 100 gives information on packet length and protocol type to the communication load determiner 1. As described above, the communication load determiner 1 counts the number of packets, calculates a communication state periodically and calculates a loaded state from the result of the communication state calculation.

When the communication load determiner 1 calculates the loaded state and the loaded state exceeds the preset threshold, the radio AP 100 determines that the load factor is high and can notify the fact to the peripheral communication nodes via a radio transmitter/receiver 43 by adding the fact to a beacon. Note that the radio transmitter/receiver 43 is realized by the radio module 160 and the wireless LAN controller 159 shown in FIG. 3.

As this occurs, a radio terminal which has received the beacon reads out the information added to the beacon and grasps the loaded state of the radio AP 100 with which the radio terminal is now in connection or is attempting to connect, so that the information can be used as a determination material to switch connecting destinations or select a connecting destination together with other indexes from the radio AP 100 such as reception radio wave intensity and throughput estimation.

Figure 11:
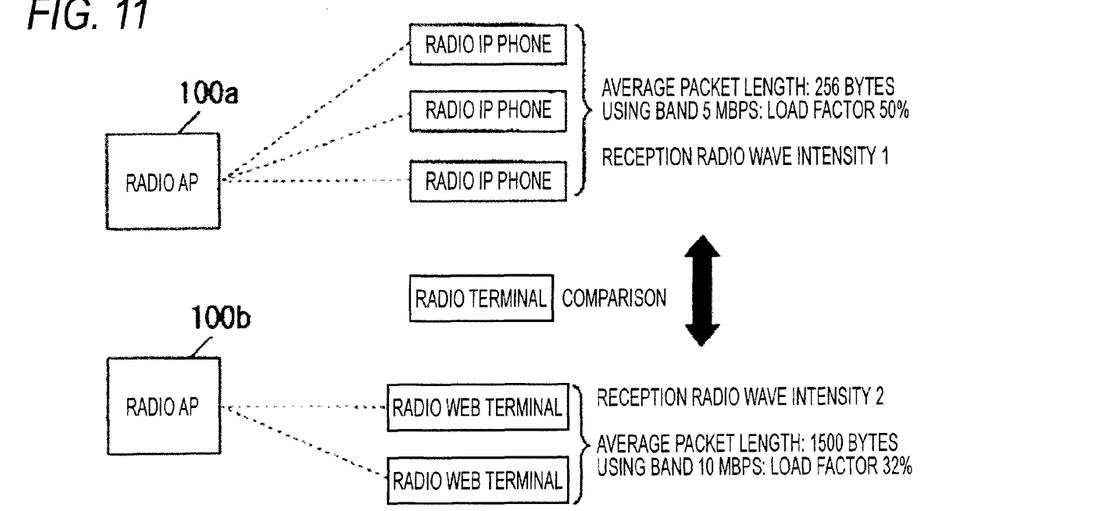
FIG. 11 is an operation explanatory diagram of the radio AP of Embodiment 2.

For example, as is shown in FIG. 11, in the event that a radio terminal selects one of two radio APs 100*a*, 100*b*, the radio terminal which has received loaded states of the radio APs 100*a*, 100*b* which are candidates for connection can compare the load factors of the two radio APs and select one of the two radio APs which has a lower load, provided that either of the two APs can be expected to provide good reception radio wave intensity and high throughput.

Alternatively, in the event that the radio AP which receives the loaded state from the communication load determiner 1 recognizes by itself from comparison of the loaded state with the preset threshold that it is in the highly loaded state, thereafter, the radio AP can reject connection requests from the radio terminal or disconnects the current connection with the radio terminal. As a selection method of selecting a terminal from which the connection is disconnected, for example, a terminal having a small communication volume can be selected. However, other methods may be adopted. In addition, since the communication load determiner 1 determines a loaded state periodically, in the event that the highly loaded state is eliminated, the radio AP 100 can change the processing so that a connection request from the radio terminal can be accepted.

By receiving the load information from the communication load determiner 1 to perform the aforesaid operations, the radio AP 100 can be made to calculate accurately a loaded state of the radio AP 100 in accordance with the packet length actually communicated or the like, so as to be allowed to correctly deal with the loaded state.

Embodiment 2

A case will be illustrated in which the radio communication device of Embodiment 1 is applied to a mesh node or an ad hoc node.

Figure 12:
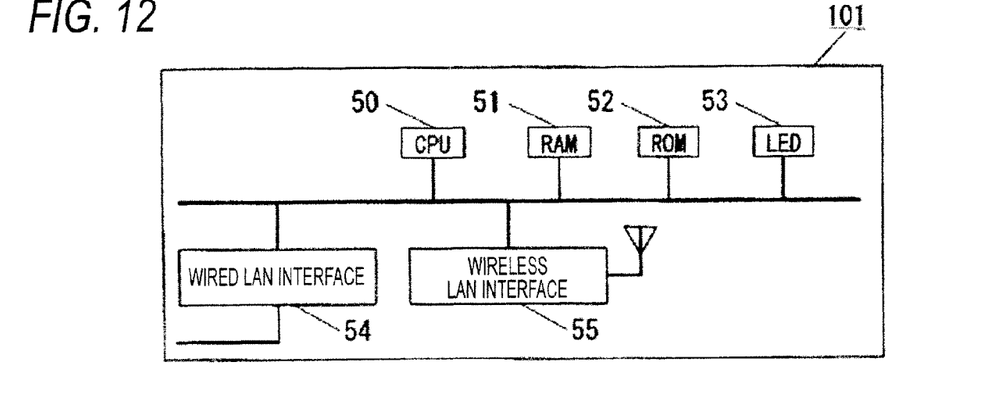
FIG. 12 is a block diagram of a mesh node of Embodiment 2.

FIG. 12 is a block diagram of a mesh node of Embodiment 2.

In FIG. 12, a mesh node 101 connects between APs by radio frequency signals and implements an inter-AP communication while implementing a multi-hop communication. A CPU 50 reads programs on a ROM 52 so as to implement a transmission/reception control, a device control, a routing control and the like. Various pieces of information regarding communication such as transmission/reception data are stored in a RAM 51. An LED 53 indicates various conditions such as a condition of a power supply or a condition of communication, that is, whether or not communication is being implemented properly.

A wired LAN interface 54 transmits and receives packets between other communication equipment and itself via lines. Some mesh nodes do not have a wired LAN interface 54. A wireless LAN interface 55 transmits and receives packets between other mesh nodes or radio terminals using radio frequency signals. Some mesh nodes have a plurality of wireless LAN interfaces 55, and in such mesh nodes, there sometimes occurs a case where one wireless LAN interface 55 is used for inter-mesh node communication, while the other wireless LAN interface 55 is used for communication with radio terminals. In the mesh node configured as described above, a packet received from the one wireless LAN interface 55 is transferred to another mesh node via the other wireless LAN interface 55.

The mesh node has a routing function which is a packet route controlling function, and this routing function is realized using a routing program stored in the ROM 52 or a routing table stored in the RAM 51.

An operation will be described with reference to FIG. 13 which occurs when the mesh node 101 configured as has been described above is equipped on a communication load determiner 1.

Figure 13:
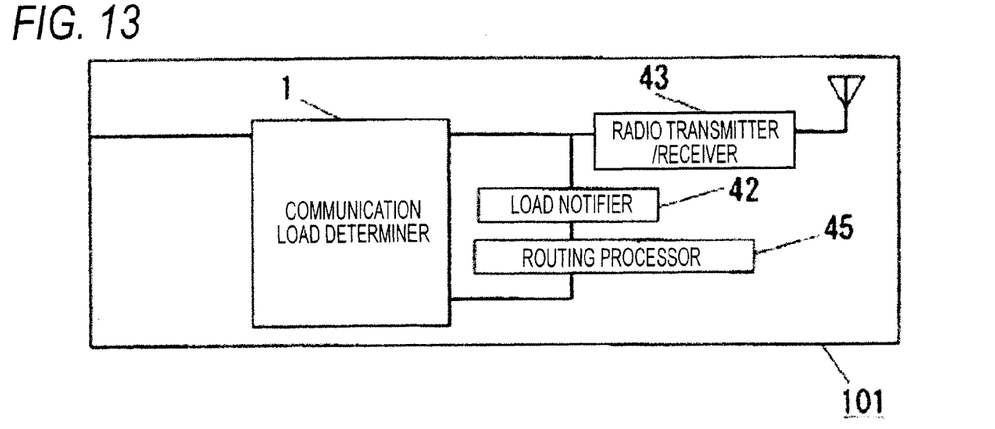
FIG. 13 is a functional block diagram of the mesh node of Embodiment 2.

FIG. 13 is a functional block diagram of the mesh node of Embodiment 2.

In FIG. 13, the mesh node 101 selects a relay mesh node for communication when implementing a multi-hop communication. When implementing a radio packet communication, the mesh node 101 delivers packet information such as packet length and protocol type to the communication load determiner 1. As has been described previously, the communication load determiner 1 counts the number of packets, calculates a communication state periodically and calculates a loaded state from the result of the communication state calculation. The mesh node 101 can be given the loaded state so calculated.

The mesh node 101 adds the load information received from the communication load determiner 1 to a beacon or routing packet via a load notifier 42 and a radio transmitter/receiver 43, so as to notify peripheral mesh nodes of the load information.

As this occurs, another mesh node 101 which has received the beacon or routing packet reads the loaded state, and a routing processor 45 grasps the loaded state of a mesh node which is to be selected as a relay node to use it as a determination material for selection of a mesh node that is so selected together with other indexes such as the reception radio wave intensity from the connected node or throughput estimation. In addition, the routing processor 45 can select an optimum communication route which is little loaded based on loaded states of the other mesh nodes 101.

Figure 14:
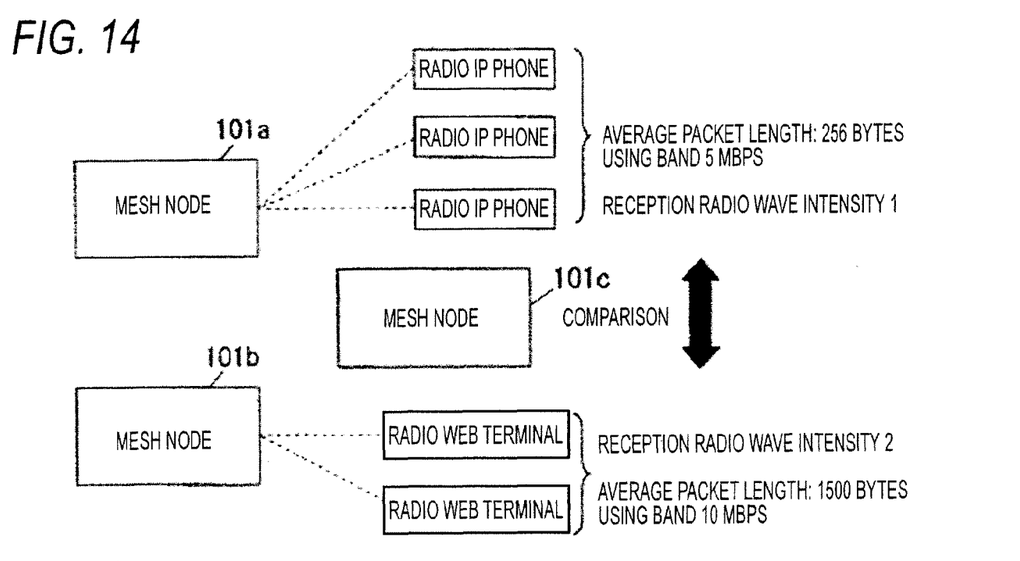
FIG. 14 is an operation explanatory diagram of the mesh node of Embodiment 2.

For example, as is shown in FIG. 14, when a mesh node 101c selects one of two mesh nodes 101a, 101b, the mesh node 101c which has received loaded states of the mesh nodes 101a, 101b which are selection candidates can select one of the mesh nodes whose load is less through comparison of load factors of the two mesh nodes, if both of the two mesh nodes 101a, 101b are expected to provide good reception radio wave intensity and high throughput.

Figure 15:
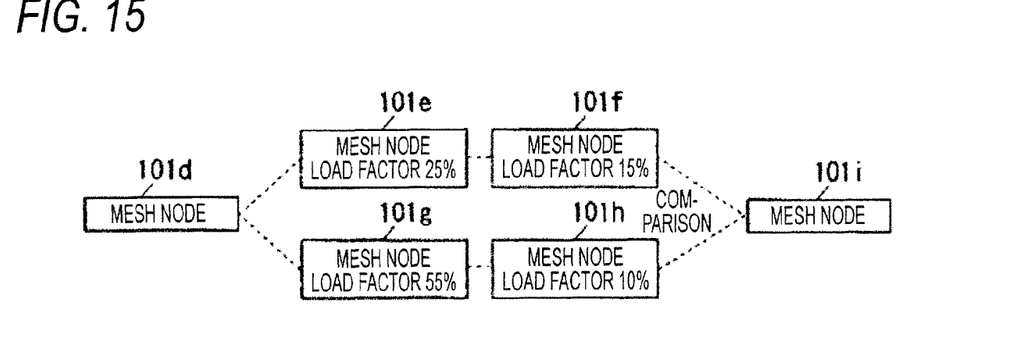
FIG. 15 is an operation explanatory diagram of the mesh node of Embodiment 2.

Alternatively, as is shown in FIG. 15, when there are two communication routes which extend from a mesh node 101i to a mesh node 101d, load factors of mesh nodes 101e to 101h on the routes are investigated, so as to select the route passing through the mesh nodes 101e, 101f which provides a lower total load factor.

Alternatively, when the routing processor 45 of the mesh node 101 which has received the loaded state from the communication load determiner 1 recognizes that the mesh node 101 is highly loaded through comparison with a preset threshold, thereafter, the routing processor 45 can reject routing requests from the other mesh nodes 101. Alternatively, the routing processor 45 can also disconnect the communication which is being currently made with the mesh node 101. As a method of selection of a terminal to be disconnected, for example, a mesh node 101 having little communication volume can be selected, but other methods may be adopted. Since the communication load determiner 1 determines a loaded state periodically, in the event that the highly loaded state is eliminated, the routing processor 45 can change the processing so that the mesh node can accept a communication request from another mesh node.

By receiving the loaded state from the communication load determiner 1 and operating as described above, the mesh node 101 can be made to calculate accurately the loaded state of the mesh node in accordance with the packet length actually communicated, thereby making it possible to deal correctly with the loaded state.

Note that while the load processing has been described as being applied to the mesh nodes 101 here, the same processing can be applied to ad hoc nodes which implement packet communication between radio terminals while implementing a multi-hop communication.

Embodiment 3

A case will be described in which the radio communication device of Embodiment 1 is applied to a radio AP having a QoS function (hereinafter, referred to as a "QoS radio AP").

Figure 16:
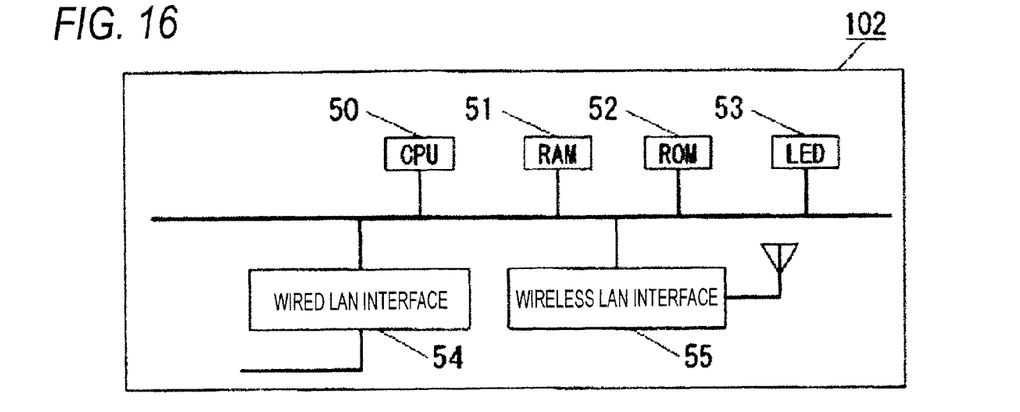
FIG. 16 is a block diagram of a QoS radio AP of Embodiment 3.

FIG. 16 is a block diagram of a QoS radio AP of Embodiment 3.

In FIG. 16, a CPU 50 reads programs on a ROM 52 to implement transmission/reception, device control and QoS control. Transmission/reception data and various pieces of information regarding QoS are stored in a RAM 51. An LED 53 indicates various conditions such as a condition of a power supply or a condition of communication, that is, whether or not communication is being properly implemented.

A wired LAN interface 54 transmits and receives packets between other communication equipment and itself by way of lines. A wireless LAN interface 55 transmits and receives packets between other radio terminals and itself using radio frequency signals. A QoS radio AP 102 that has a configuration like this processes QoS requests form other radio terminals, transfers a packet received from the wireless LAN interface 55 to the wired LAN interface 54 or transfer a packet other way round. The QoS function is realized using a QoS program stored within the ROM 52 or a QoS control table stored within the RAM 51.

A communication load determination operation in the QoS radio AP 102 configured as has been described above will be described with reference to FIG. 17.

Figure 17:
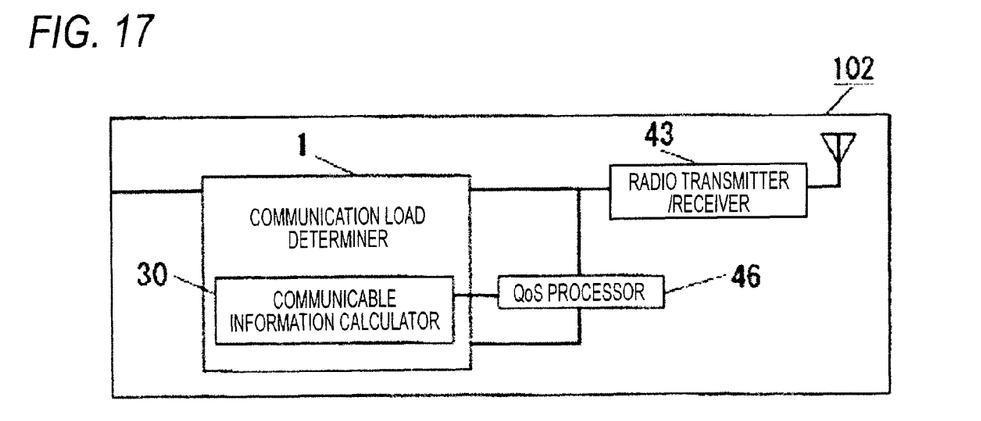
FIG. 17 is a functional block diagram of the QoS radio AP of Embodiment 3.

FIG. 17 is a functional block diagram of the QoS radio AP of Embodiment 3.

In FIG. 17, the QoS radio AP 102 having a QoS processor 46 delivers packet information such as packet length and protocol type to a communication load determiner 1 when implementing a radio packet communication by way of a radio transmitter/receiver 43.

As described previously, the communication load determiner 1 counts the number of packets, calculates a communication state periodically and calculates a load factor from the result of the communication state calculation.

The QoS radio AP 102 can receive a load factor that has been calculated by the communication load determiner 1. Having so received the load factor, the QoS radio AP 102 which has received a band request from another radio node delivers information such as an average packet length that is used by the radio terminal which has made the band request to a communicable information calculator 30 provided in the communication load determiner 1 and then receives a communicable band from the communicable information calculator 30. Next, the QoS radio AP 102 calculates a current communicable band which is associated with the average packet length using Expression 11 below.

[Expression 11]

Current communicable band=(communicable band associated with average packet length×(1−load factor))

Figure 18:
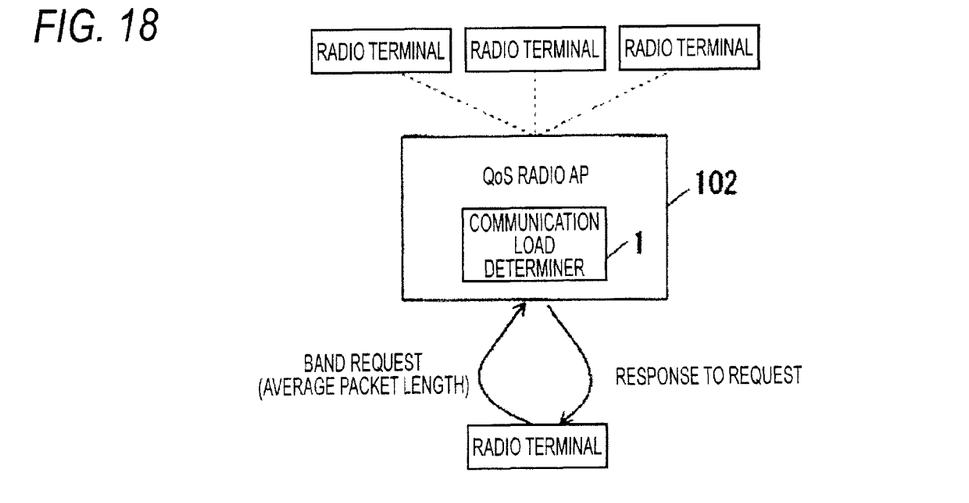
FIG. 18 is an operation explanatory diagram of the QoS radio AP of Embodiment 3.

In this case, as is shown in FIG. 18, the QoS radio AP 102 which has received the average packet length and the QoS band request calculates the current communicable band using Expression 11, and the QoS processor 46 compares the current communicable band so calculated with the requested band of the radio terminal and determines whether or not the request is to be accepted in accordance with the load factor.

By receiving the load information from the communication load determiner 1 and operating in the way described above, the QoS radio AP 102 can be made to calculate accurately the current communicable band in accordance with the packet length actually communicated, thereby making it possible to deal correctly with the current loaded state and the band request from the radio terminal.

The radio communication device according to the invention can be applied to a radio communication device which activates some operation based on determination of the loaded condition of a radio node. Namely, when a radio terminal selects an optimum radio AP in accordance with the loaded condition of the radio AP, the radio communication device of the invention can be used in such a way that a mesh node which is mesh-connected avoids a mesh node which is highly loaded and selects a mesh node which is low loaded or selects a route which is low loaded. Alternatively, when the QoS radio AP which supports QoS receives a band request from a radio terminal, the radio communication device of the invention can be used to determine whether or not the band request is to be accepted. In particular, in radio IP phones which tend to be propagated widely in recent years, since voice data are communicated and many short packets are used, in the event that the radio communication device of the invention is applied to a radio AP which is combined with a radio IP phone, the advantage is enhanced.

This application is based upon and claims the benefit of priority of Japanese Patent Application No. 2007-180640 filed on Jul. 10, 2008, the contents of which are incorporated herein by reference in its entirety.

What is claimed is:

1. A communication device for performing data communication with another communication device comprising:
    a communicator which communicates with the other communication device by transmitting and/or receiving data included in a packet;
    a communication meter which calculates the length of the packet; and
    a controller which obtains communication load information of a ratio of throughput to maximum throughput, the maximum throughput corresponding to the length of the packet, wherein:
    the maximum throughput has characteristics in which the longer the length of the packet, the higher is the maximum throughput.

2. The communication device as set forth in claim 1, further comprising:
    a communication controller which controls to transmit the communication load information to the other communication device through the communicator.

3. The communication device as set forth in claim 1, when the communicator receives communication load information transmitted from another communication device to look for a new access point, the new access point is selected based on the communication load information transmitted from the other communication device.

4. The communication device as set forth in claim 1, when the communicator receives communication load information of plural communication devices, the controller selects, among the plural communication devices, a communication device which transmits the communication load information having the lowest ratio.

5. The communication device as set forth in claim 1, wherein when the controller determines that the communication load information is higher than a predetermined value, if the communicator receives a connection request from the other communication device, the controller rejects the connection request.

6. The communication device as set forth in claim 1, wherein when the controller determines that the communication load information is higher than a predetermined value, the controller disconnects a communication with the other communication device.

7. The communication device as set forth in claim 1, wherein when the controller is requested for a predetermined throughput from the other communication device and the communicator receives information on a necessary band for the predetermined throughput, the controller determines whether the necessary band is secured on the basis of the received information.

8. The communication device as set forth in claim 1, wherein the controller obtains the communication load information every predetermined period.

9. The communication device as set forth in claim 1, wherein the controller obtains the communication load information in response to a request from the other communication device.

10. The communication device as set forth in claim 1, wherein:
- the communicator transmits the communication load information to the other communication device, and
- when the controller selects a route among a plurality of routes including plural communication devices and the controller receives communication load information of the plural communication devices, the controller selects a route not including a communication device of a high load state.

11. The communication device as set forth in claim 10, wherein the controller re-selects a route when the communication device of the high load state is found on the selected route.

12. A communication load calculation method for a communication device for performing data communication with another communication device the method comprising:
- communicating with the other communication device by transmitting and/or receiving data included in a packet;
- calculating the length of the packet; and
- obtaining communication load information of a ratio of throughput to maximum throughput, the maximum throughput corresponding to the length of the packet, wherein;
- the maximum throughput has characteristics in which the longer the length of the packet, the higher is the maximum throughput.

13. The communication device as set forth in claim 1, wherein the length of the packet calculated by the communication meter is the average length of packets including data transmitted and/or received for a predetermined period by the communicator.

14. The communication device as set forth in claim 1, wherein the communicator communicates, through a wireless medium, with the other communication device.

15. A communication device for performing data communication with another communication device, comprising:
- a communicator which communicates with the other communication device by transmitting and/or receiving data included in a packet;
- a communication meter which calculates the length of the packet; and
- a controller which obtains communication load information of a ratio of packet number to maximum packet number, the maximum packet number corresponding to the length of the packet, wherein:
- the maximum packet number has characteristics in which the longer the length of the packet, the smaller is the maximum packet number.

16. The communication device as set forth in claim 15, wherein the length of the packet calculated by the communication meter is the average length of packets including data transmitted and/or received for a predetermined period by the communicator.

17. The communication device as set forth in claim 15, wherein the communicator communicates, through a wireless medium, with the other communication device.

18. A communication load calculation method for a communication device for performing data communication with another communication device, the method comprising:
- communicating with the other communication device by transmitting and/or receiving data included a packet;
- calculating the length of the packet; and
- obtaining communication load information of a ratio of packet number to maximum packet number, the maximum packet number corresponding to the length of the packet, wherein:
- the maximum packet number has characteristics in which the longer the length of the packet, the smaller is the maximum packet number.

* * * * *